(12) United States Patent
Suda et al.

(10) Patent No.: US 6,613,177 B1
(45) Date of Patent: Sep. 2, 2003

(54) PROCESS AND APPARATUS FOR THE PRODUCTION OF STRIP JOINT MEMBER

(75) Inventors: Nobuyuki Suda, Kodaira (JP); Yasuo Mizota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 125 days.

(21) Appl. No.: 09/691,203

(22) Filed: Oct. 19, 2000

(30) Foreign Application Priority Data

Oct. 25, 1999 (JP) .............................. 11-302089

(51) Int. Cl.$^7$ ............................... B32B 31/10
(52) U.S. Cl. ................ 156/264; 156/266; 156/304.1; 156/304.5
(58) Field of Search .............. 156/264, 304.1, 156/304.5, 502, 507, 512, 406.4, 110.1, 117, 118

(56) References Cited

U.S. PATENT DOCUMENTS 5,571,354 A  11/1996  Miyamoto 6,280,556 B1 * 8/2001 Okada et al. ............... 156/264

FOREIGN PATENT DOCUMENTS

| DE | 195 45 079 A1 | 6/1996 |
| EP | 0 434 404 A2 | 6/1991 |
| EP | 0 467 560 A2 | 1/1992 |
| EP | 0 619 170 A2 | 10/1994 |
| JP | 2-151426 A | 6/1990 |

* cited by examiner

Primary Examiner—Richard Crispino
Assistant Examiner—Cheryl N. Hawkins
(74) Attorney, Agent, or Firm—Oliff & Berridge, PLC

(57) ABSTRACT

A strip joint having a required length is produced by obliquely feeding a given amount of a strip of rubberized cords onto a conveyor from a given separated distance, cutting the strip along the conveyor, moving the cut strip piece in a given moving pitch amount through the conveyor, joining a front end portion of a subsequently fed strip piece to a rear end portion of the preceding strip piece, and successively repeating these procedures, wherein the moving pitch amount is adjusted by controlling the movement of the conveyor.

2 Claims, 5 Drawing Sheets

PROCESS AND APPARATUS FOR THE PRODUCTION OF STRIP JOINT MEMBER

BACKGROUND OF THE INVENTION

1. Field of the Invention

This invention relates to a process and an apparatus for producing a strip joint member by joining strip pieces each made of plural cords coated with rubber.

2. Description of Related Art

As a tire constitutional member is used a strip joint formed by a process wherein a strip embedded with steel cords or the like therein is successively cut into pieces having a given length and then these pieces are joined at their no-cut ends with each other to form a new strip joint.

In an apparatus for producing such a strip joint, the strip is obliquely fed onto a conveyor in a given amount from a position separated by a given distance from the side of the conveyor in a given inclination angle with respect to the conveyor and cut along the side edge of the conveyor, and the thus cut strip piece is moved by a given distance through the conveyor, and then the strip is again fed onto the conveyor in a given amount from the given position in the given inclination angle and overlapped at its edge portion with an edge portion of the preceding strip piece moved by the given distance through the conveyor to join them with each other.

A continuous strip joint formed by successively joining the strip pieces with each other as mentioned above is taken up on a winding roller, and then taken off from the winding roller at subsequent step and cut into a constant length to produce a strip joint having a given length.

Since the continuous strip joint is taken up on the winding roller and again taken off therefrom and cut into the constant length, there are many steps for producing the strip joint of given length and hence the strip piece is easily deformed and it is required to widen an installation space and increase a production cost.

And also, when the continuous strip joint is cut into the constant length, the cutting angle does not coincide with an inclination angle of the cord embedded therein and hence there is caused a fear of exposing the cord therefrom.

Furthermore, even in case of cutting into the constant length, the number of the cords embedded in the strip joint is not necessarily constant among the cut strip joints.

SUMMARY OF THE INVENTION

It is, therefore, an object of the invention to provide a process and an apparatus capable of cheaply producing a strip joint of a stable quality, which hardly deforms and does not expose the cords and makes the number of embedded cords constant, at few production steps.

According to a first aspect of the invention, there is the provision of in a process for producing a strip joint by feeding a given amount of a strip of a constant width, which is formed by coating a plurality of cords with rubber, onto a conveyor from a position separated by a given distance at the side of the conveyor in a direction of a given inclination angle, cutting the strip along the conveyor, moving the cut strip piece in a given moving pitch amount through the conveyor, joining a front end portion of a subsequently fed strip piece to a rear end portion of the preceding strip piece, and successively repeating these procedures to produce a continuous strip joint, an improvement wherein the moving pitch amount is adjusted by controlling the movement of the conveyor to produce a strip joint of a required length.

The strip joint of the required length can be produced by adjusting the moving pitch amount in the joining through the repetitive moving of the strip pieces, so that steps of taking up the strip joint on the winding roller and taking off therefrom to cut into a constant length are omitted and hence the number of steps for producing the strip joint of the required length is reduced.

As a result, the possibility of deforming the strip piece is less, and the installation space is made narrow and the reduction of the cost can be attained.

And also, the cutting of the strip joint into the constant length is not conducted, so that the cords embedded therein are not exposed and the number of the embedded cords is always constant, and hence the strip joint of stable quality can be produced.

According to a second aspect of the invention, there is the provision of in a process for producing a strip joint by feeding a given amount of a strip of a constant width, which is formed by coating a plurality of cords with rubber, onto a conveyor from a position separated by a given distance at the side of the conveyor in a direction of a given inclination angle, cutting the strip along the conveyor, moving the cut strip piece in a given moving pitch amount through the conveyor, joining a front end portion of a subsequently fed strip piece to a rear end portion of the preceding strip piece, and successively repeating these procedures to produce a continuous strip joint, an improvement wherein the number of strip pieces to be joined is decided in accordance with a length of the strip joint to be produced based on the constant width of the strip and the given inclination angle of the strip fed to the conveyor, and a moving pitch amount of the strip piece is calculated from the decided number of the strip pieces and the length of the strip joint to be produced, and the strip pieces are repeatedly moved by controlling the movement of the conveyor based on the calculated moving pitch amount to produce a strip joint having the decided number of the strip pieces.

Since the width of the strip piece in a moving direction of the conveyor is constant, when the number of the strip pieces required for joining the strip pieces in the moving direction to produce the strip joint of the required length is decided, the moving pitch amount of the strip piece can be calculated and the strip pieces are repeatedly moved by controlling the movement of the conveyor based on the calculated moving pitch amount, whereby the decided number of the strip pieces can be joined to produce the strip joint of the required length.

Even in this case, the number of steps for producing the strip joint of the required length is reduced, and the possibility of deforming the strip piece is less, and the installation space is made narrow and the reduction of the cost can be attained.

And also, the cutting of the strip joint into the constant length is not conducted, so that the cords embedded therein are not exposed and the number of the embedded cords is always constant, and hence the strip joint of stable quality can be produced.

In a preferable embodiment of the above processes, a margin portion is formed in at least one side edge of the strip.

When the number of the strip pieces to be joined is decided so as to successively dispose the strip pieces on the conveyor in intervals, the subsequent strip piece is overlapped with the preceding strip piece at their margin portions, whereby the joining quality can be improved.

According to a third aspect of the invention, there is the provision of an apparatus for producing a strip joint, comprising a conveyor moving a strip piece, a feeding means for feeding a given amount of a strip onto the conveyor from a position separated by a given distance at the side of the conveyor in a direction of a given inclination angle, a cutting means disposed just before the conveyor for cutting the strip fed from the feeding means into a strip piece, a joining means for joining edge portions of a preceding strip piece and a subsequent strip piece to each other on the conveyor, a computing means for deciding the number of strip pieces to be joined in accordance with a length of a strip joint to be produced and calculating a moving pitch amount in the repetitive movement of the strip piece through the conveyor, and a control means for controlling the movement of the conveyor based on the joining number and moving pitch amount decided by the above computing means.

Thus, the movement of the conveyor is controlled in the calculated moving pitch amount to repeatedly move the strip pieces to join the calculated number of the strip pieces, whereby the strip joint of the required length can be produced.

Even in this case, the number of steps for producing the strip joint of the required length is reduced, and the possibility of deforming the strip piece is less, and the installation space is made narrow and the reduction of the cost can be attained. And also, the cutting of the strip joint into the constant length is not conducted, so that the cords embedded therein are not exposed and the number of the embedded cords is always constant, and hence the strip joint of stable quality can be produced.

In a preferable embodiment of the apparatus, the computing means decides the number of strip pieces to be joined in accordance with a length of a strip joint to be produced based on a constant width of the strip and a given inclination angle of the strip fed onto the conveyor, and calculates a moving pitch amount of the strip piece from the decided number and the length of the strip joint to be produced.

Since the width is constant in a moving direction of the strip piece through the conveyor, the number of the strip pieces required for joining the strip pieces in the moving direction to produce the strip joint of the required length can be decided and the moving pitch amount can be calculated from the decided number of the strip pieces.

BRIEF DESCRIPTION OF THE DRAWINGS

The invention will be described with reference to the accompanying drawings, wherein.

DESCRIPTION OF PREFERRED EMBODIMENTS

An embodiment of the invention is explained with reference to FIGS. 1 to 8 below.

Figure 1:
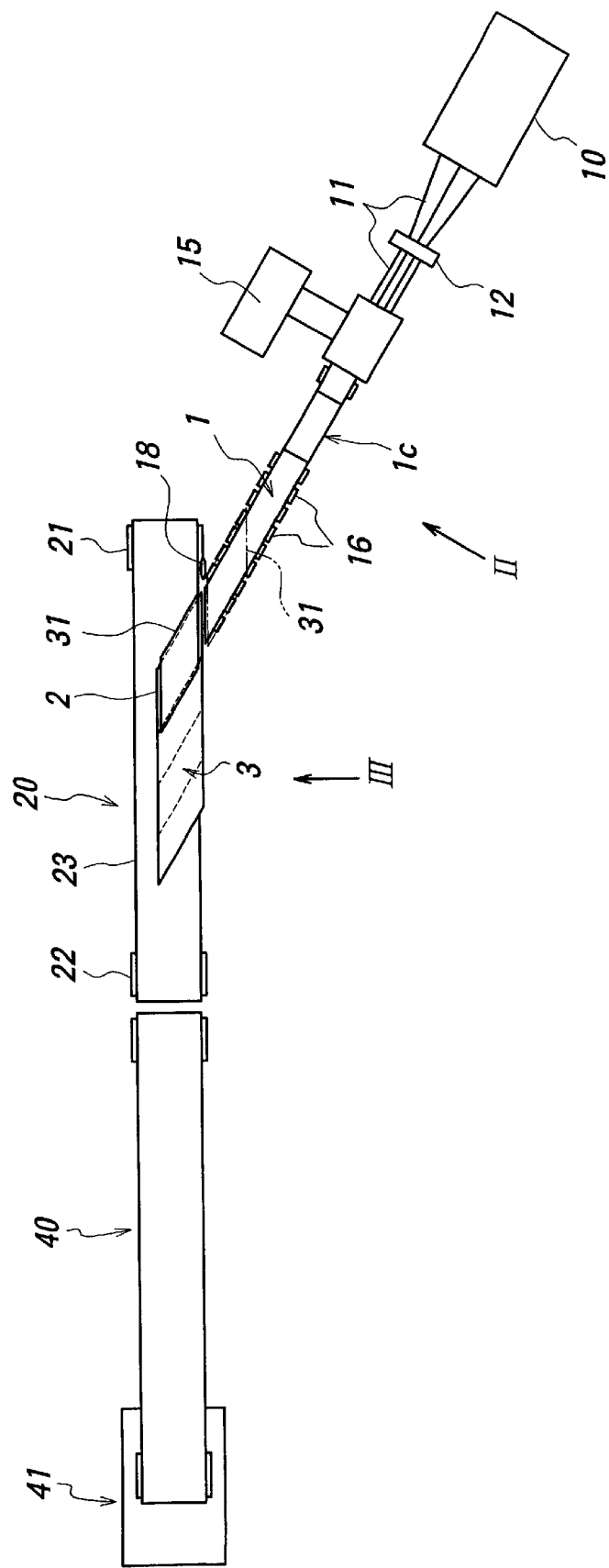
FIG. 1 is a diagrammatic plan view illustrating a whole of steps for producing a strip joint according to an embodiment of the invention.
Figure 2:
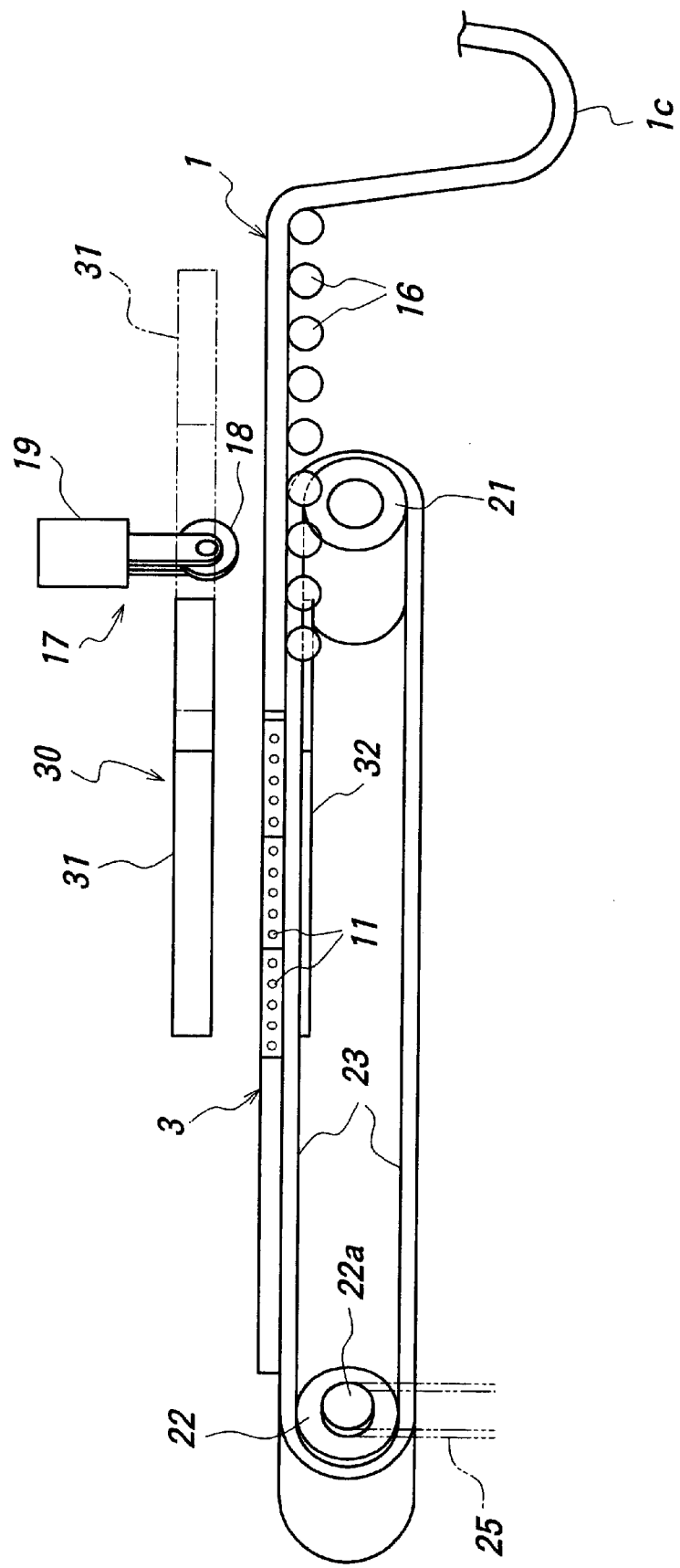
FIG. 2 is a fragmentary view taken in the direction of an arrow II of FIG. 1.
Figure 3:
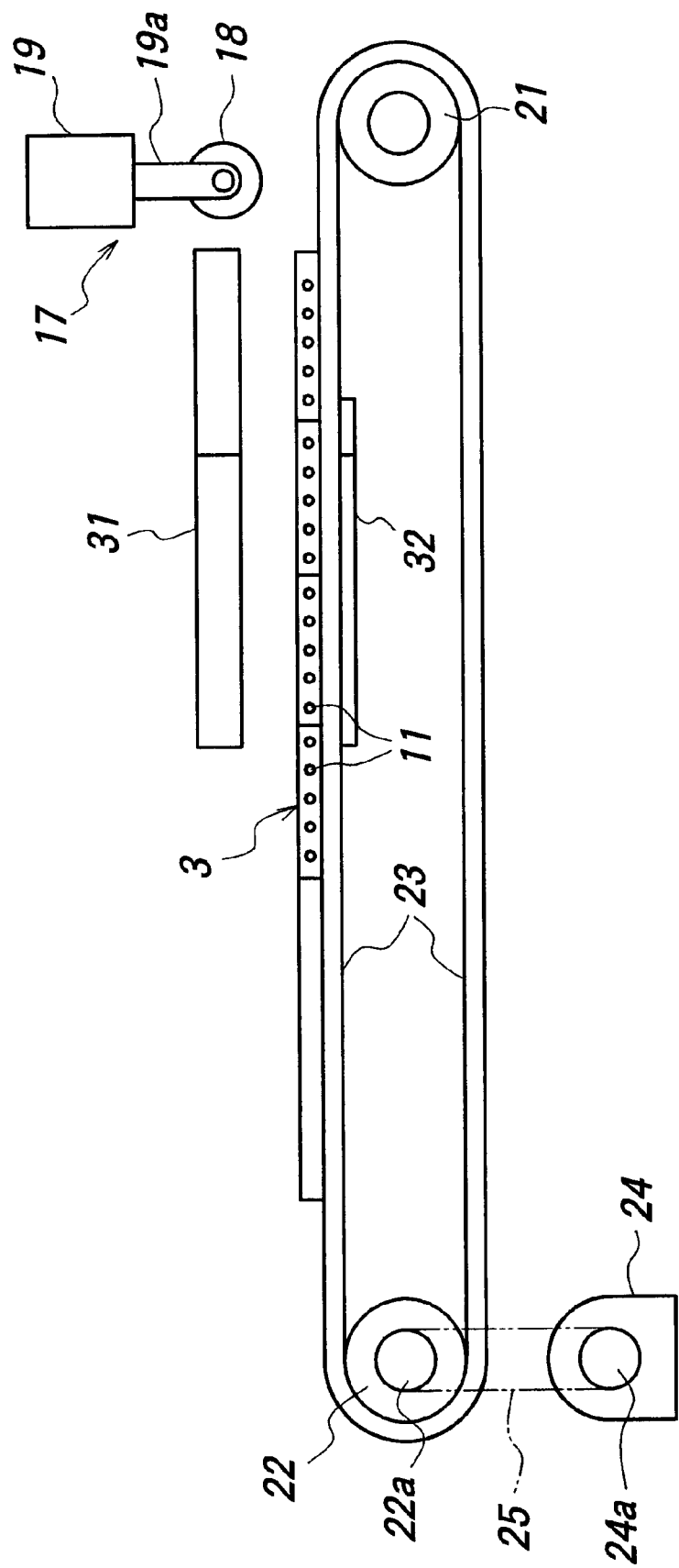
FIG. 3 is a fragmentary view taken in the direction of an arrow III of FIG. 1.

A strip joint 3 to be produced in this embodiment is a belt member as a constitutional member of a tire, and a whole of steps for the production of such a strip joint 3 is shown in FIG. 1 as a plan view.

A creel stand 10 feeding steel cords 11 is disposed at an uppermost stream side, and a given number of steel cords 11 drawn out from the creel stand 10 are aligned through a positioning member 12 and fed into an extruding machine 15, at where these steel cords 11 are coated with rubber, from which a strip 1 is continuously extruded.

Thus, a band-shaped strip 1 embedding the given number of steel cords 11 therein in a longitudinal direction thereof is continuously extruded, during which margin rubbers are formed at both sides of the strip 1. However, the strip 1 is fed to a belt conveyor 20 at a state of leaving a rightside margin rubber 1b after a left-side margin rubber is cut out as shown in FIG. 4.

Figure 4:
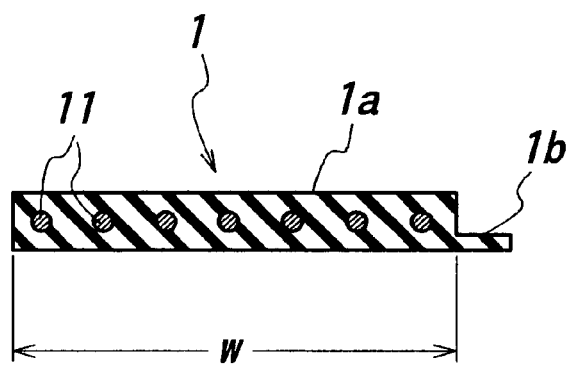
FIG. 4 is a diagrammatically section view of a strip.

A section of such a strip 1 is shown in FIG. 4.

The strip 1 is comprised of a strip body 1a and a margin rubber 1b extending rightward therefrom, so that a width w of the strip 1 corresponds to a width of the strip body 1a.

A top of the thus continuously shaped strip 1 is placed on roller conveyors 16 through a festoon 1c thereof.

The roller conveyors 16 are arranged so as to obliquely feed the strip 1 onto the belt conveyor 20 from a position separated by a given distance at a side thereof in a direction of a given inclination angle with respect thereto.

Moreover, a plate may be used instead of the roller conveyors 16.

A cutting device 17 is arranged so as to run a cutter 18 along a left-side edge of a conveyor belt 23 in the belt conveyor 20 fed with the strip 1.

A cylinder 19 in the cutting device 17 descends the cutter 18 and runs in front and rear directions. By such an action of the cylinder 19, the strip 1 fed onto the belt conveyor 20 is cut out along the left-side edge of the conveyor belt 23 with the cutter 18, whereby a strip piece 2 can be left on the conveyor belt 23.

As the cutting device 17, use may also be made of so-called guillotine type cutting device wherein the strip is forcedly cut by dropping a cutter downward.

In order to transfer the top portion of the strip 1 placed on the roller conveyors 16 to the conveyor belt 23, a drawing device 30 is disposed above the roller conveyors 16.

The drawing device 30 comprises an adsorption plate 31 having a width somewhat wider than that of the strip 1 and substantially the same parallelogram as in the cut strip piece 2, which is suspended at a horizontal state from above, and an electromagnet (not shown) embedded in the adsorption plate 31 and capable of adsorbing the steel cords 11 in the strip 1.

The adsorption plate 31 is reciprocally supported along the transferring direction of the strip 1 between an end portion of the roller conveyor 16 and the conveyor belt 23 extended therefrom and suspended at a liftable state in up and down directions.

Therefore, the adsorption plate 31 is lowered onto the top portion of the strip 1 placed on the roller conveyors 16 and thereafter the electro-magnet therein is excited to absorb the top portion of the strip 1, and then adsorption plate 31 is lifted upward at the adsorbed state and transferred toward the conveyor belt 23 so as to draw out a given amount of the strip 1 from the roller conveyor. Next, the adsorption plate 31 is lifted down at a given position on the conveyor belt and the electromagnet is demagnetized, whereby the top portion of the strip 1 can be fed onto the conveyor belt 23.

Moreover, the width of the adsorption plate 31 is somewhat wider than that of the strip 1, so that it is utilized as a pressure joining means. That is, the adsorption plate 31 is pushed down onto the subsequent strip piece 2 overlapped at its edge portion with the preceding strip piece, whereby the edge portions of these strip pieces 2 can be joined on the conveyor belt 23.

Against the pushing of the adsorption plate 31 is arranged a receiving plate 32 beneath a rear surface of the conveyor belt 23 therealong.

In the belt conveyor 20, the conveyor belt 23 is extended between a pair of rotating rolls 21, 22, while a timing belt 25 is extended between a timing pulley 22a fitted onto a rotating shaft of the rotating roll 22 and a timing pulley 24a fitted onto a driving shaft of an AC servomotor 24.

Thus, the rotating roll 22 is rotated through the timing belt 25 by the driving of the AC servomotor 24 and hence the conveyor belt 23 is rotated by the rotation of the rotating roll 22 to move the strip piece 2 on the conveyor belt 23.

A building servicer 40 as a belt conveyor is disposed at a downstream side of the belt conveyor 20, and a BT drum 41 is disposed beneath a downstream end of the building servicer 40.

An operation procedure is described with respect to the apparatus for the production of the strip joint 3 having the above structure below. At first, the strip 1 is extruded by coating the steel cords 11 with rubber through the extruder 15 and a margin rubber is cut out from the strip, and then a top portion of the strip is placed through a festoon 1c onto the roller conveyors 16.

The strip 1 has a section as shown in FIG. 4 in which a remaining margin rubber 1b is extended rightward from a strip body 1a having a width w.

The top portion of the strip 1 placed on the roller conveyors 16 is adsorbed by the adsorption plate 31 of the drawing device 30 and fed onto the conveyor belt 23 by a given amount in an oblique direction and placed thereon. Then, the cutter 18 of the cutting device 17 is descended and run along the left side edge of the conveyor belt 23 to obliquely cut the strip 1.

Thereafter, the cutter 18 is returned to an original home position and the adsorption is released to raise the adsorption plate 31 upward, whereby the strip piece 2 is left on the conveyor belt 23 and moved in a required moving pitch amount by moving the conveyor belt 23 through the driving of the AC servomotor 24. Thus, the preceding strip piece 2 is moved in the calculated moving pitch amount with a well accuracy by driving the AC servomotor 24 though the calculation of the moving pitch amount is mentioned later.

The adsorption plate 31 of the drawing device 30 is moved to the roller conveyors 16 at substantially the same time of moving through the conveyor belt 23 to adsorb a given amount of a top portion of the strip for a subsequent strip piece and then drawn out from the roller conveyors and placed onto the conveyor belt 23.

In this way, the subsequent strip piece 2 is advanced up to a given position capable of joining a front side edge portion of the subsequent strip piece 2 to a rear side edge portion of the preceding strip piece 2 moved in the calculated moving pitch amount.

Both the edge portions are joined by pushing the adsorption plate 31 downward from above.

Thereafter, the cutter 18 of the drawing device 17 is run along the left-side edge of the conveyor belt 23 to obliquely cut the strip to form a subsequent strip piece 2.

The above procedure is successively repeated to form a strip joint 3. That is, the given number of the strip pieces are successively joined with each other to form a strip joint having a given length.

Thus, the strip joint 3 forms a belt member obliquely embedding the steel cords therein or so-called bias cord member.

The thus obtained strip joint 3 is transferred from the conveyor belt 23 through the building servicer 40 to the BT drum 41 and wound around the BT drum 41.

The calculation with respect to the number of strip pieces for the formation of the strip joint 3 having the required length and the moving pitch amount of the strip piece 2 through the belt conveyor 20 is explained below.

The size of the belt member is determined by a size of a tire to be manufactured. That is, peripheral length and width of the belt member are defined by a combination of length L and width W of the strip joint 3.

Figure 5:
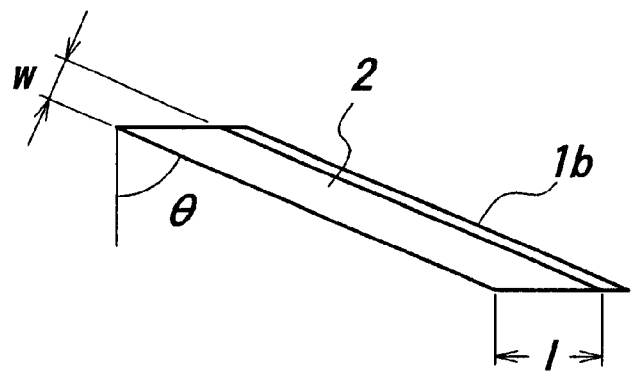
FIG. 5 is a diagrammatically plan view of a strip piece.
Figure 6:
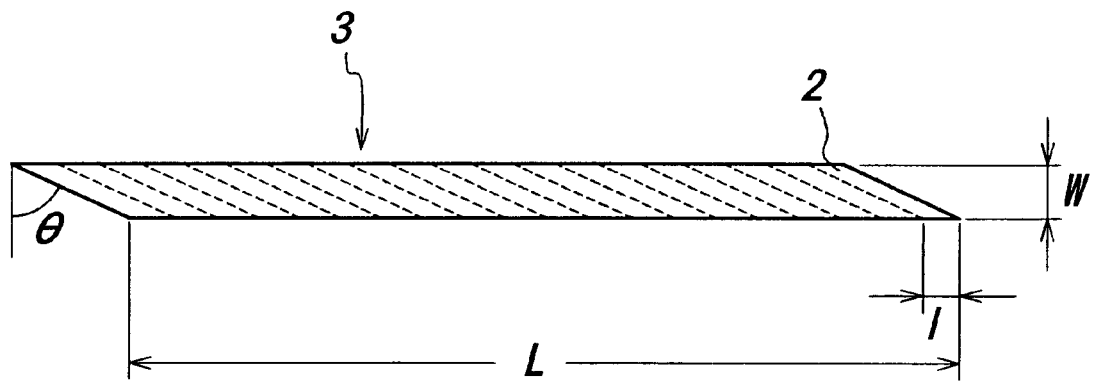
FIG. 6 is a diagrammatically plan view of a strip joint.

As shown in FIG. 6, when the strip joint 3 having a length L and a width W is produced from the strip 1 having a width w, if a cutting angle of the strip 1 through the cutter 18 (angle in a direction of feeding the strip 1 through the roller conveyors 16 with respect to a face perpendicular to the moving direction through the conveyor belt 23) is $\theta$, a width l of the strip piece 2 in the moving direction through the conveyor belt 23 is $w/\sin(90°-\theta)$ as seen from FIG. 5, and the number of the strip pieces 2 is decided by dividing the length L of the strip joint 3 by the width l (L/l). Further, moving pitch MP amount of the strip piece 2 is calculated by MP=l+((L−(l*N))/(N−1)), wherein the joining number is (N−1).

The above is explained with reference to the following concrete example.

Now, the cutting angle θ of the strip 1 is 66 degrees, and the width w of the strip 1 is 36 mm, and the length L and width W of the strip joint 3 to be produced are 1800 mm and 150 mm, respectively.

The width 1 of the strip piece 2 in the moving direction through the conveyor belt 23 is 88.509 mm from the above w/sin (90°−θ), so that L/1 for deciding the number of the strip pieces 2 is calculated to be 20.337 and hence the number of the strip pieces 2 is 20 or 21.

Assuming that the number of the strip pieces is 20, a length when twenty strip pieces 20 are arranged with no space is 88.509×20=1770.18 mm, which is shorter by 29.82 mm than the length (1800 mm) of the strip joint 3. Therefore, when these strip pieces are dispersed by the joining number of 19, they are arranged at an interval of 1.57 mm (=29.82/19) per one joint portion.

As a result, the moving pitch amount of the strip piece 2 is 90.079 mm (=88.509+1.57) or about 90.1 mm, so that the conveyor belt 23 is moved in the moving pitch amount of 90.1 mm by controlling the AC servomotor 24.

Figure 7:
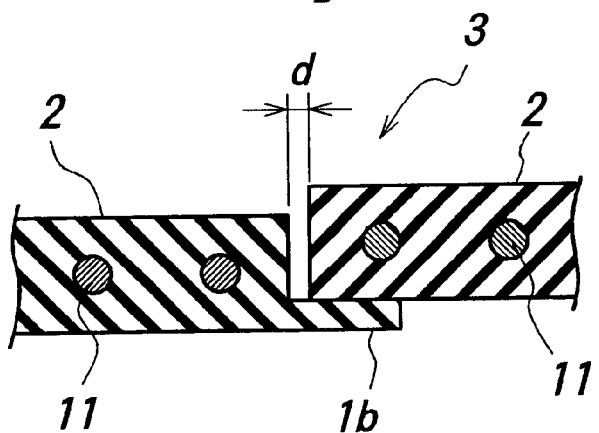
FIG. 7 is a diagrammatically section view illustrating a joint portion between strip pieces.

A section of a joint portion at this time (section cut at a face perpendicular to the steel cord 11) is shown in FIG. 7.

As seen from FIG. 7, a space d (0.64 mm=1.57×sin(90°−66°)) is existent between the rear edge of the preceding strip piece 2 and the front edge of the subsequent strip piece 2 overlapped on the margin rubber 1b of the preceding strip piece.

The joint portion between both the strip pieces is pressed and joined by pushing the adsorption plate 31 of the drawing device 30 downward from above.

If the margin rubber 1b is not formed in the strip piece 2, the preceding and subsequent strip pieces 2 can be joined by using a joint roller or the like even in the presence of the somewhat space d.

Assuming that the number of the strip pieces is 21, a length when twenty one strip pieces 20 are arranged with no space is 88.509×21=1849.86 mm, which is longer by 49.86 mm than the length (1800 mm) of the strip joint 3. Therefore, when these strip pieces are dispersed by the joining number of 20, they are arranged at an overlap of 2.493 mm (=49.86/20) per one joint portion.

As a result, the moving pitch amount of the strip piece 2 is 86.016 mm (=88.509−2.493) or about 86 mm, so that the conveyor belt 23 is moved in the moving pitch amount of 86 mm by controlling the AC servomotor 24.

Figure 8:
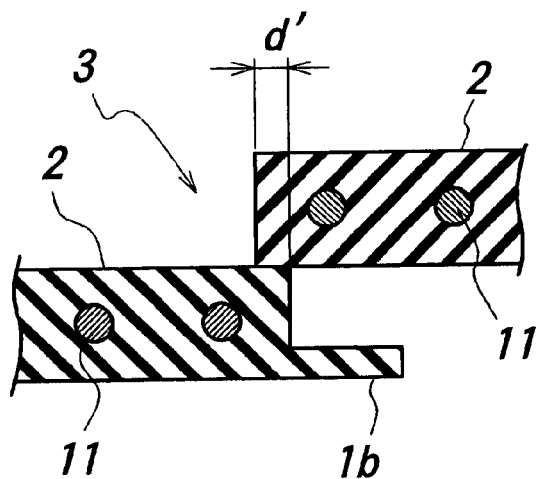
FIG. 8 is a diagrammatically section view illustrating another joint portion between strip pieces.

A section of a joint portion at this time (section cut at a face perpendicular to the steel cord 11) is shown in FIG. 8.

As seen from FIG. 8, the front end portion of the subsequent strip piece 2 is overlapped with the rear end portion of the preceding strip piece 2 at an overlapped width d' (1.014 mm=2.493×sin(90°−66°)). Such an overlapped portion is pressed and joined by pushing the adsorption plate 31 of the drawing device 30 downward from above.

If the width 1 of the strip piece 2 in the moving direction through the conveyor belt 23 is 90 mm, twenty strip pieces 2 can be just aligned without forming the space or overlapped portion. A section of a joint portion at this time (section cut at a face perpendicular to the steel cord 11) is shown in FIG. 9.

Figure 9:
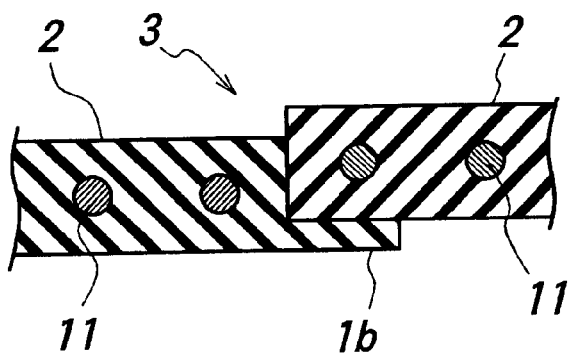
FIG. 9 is a diagrammatically section view illustrating the other joint portion between strip pieces.

As seen from FIG. 9, a front end face of the subsequent strip piece 2 is butted to a rear end face of the preceding strip piece 2 and the front end portion of the subsequent strip piece 2 is laid on the margin rubber 1b of the preceding strip piece 2. Both the strip pieces are pressed and joined by the adsorption plate 31.

As mentioned above, in the production of the strip joint 3 having the required length L, the number of the strip pieces 2 to be joined is decided from the width w and cutting angle θ of the strip piece 2, and then the moving pitch amount of the belt conveyor 20 is calculated from the decided strip piece number, and the strip piece is repeatedly moved by the calculated moving pitch amount to join the decided number of the strip pieces. Thus, there can be produced the strip joint having the required length.

When the length L of the belt member (strip joint) is changed in order to manufacture a tire having a different size, the number of the strip pieces 2 is decided by the calculation based on the changed length and then the moving pitch amount is calculated from the decided number to control the movement of the belt conveyor.

Therefore, various belt members can be produced by using the apparatus according to the invention.

Moreover, if it is required to change the width W together with the length L of the belt member, it is sufficient to adjust the feeding amount of the front end portion of the strip 1 onto the conveyor belt 23 through the adsorption plate 31 of the drawing device 30.

As seen from the above, there is no step of taking up the strip joint and then taking off to cut into a constant length, and hence the number of steps for the formation of the strip joint having the required length is decreased.

For this end, the possibility of deforming the strip joint is less and the installation space is made narrow and the cost can be reduced.

And also, the cutting of the strip joint into constant length is not conducted, so that there are not exposed the embedded steel cords from the strip piece, and the number of the embedded steel cords is always constant and hence the strip joint having the stable quality can be produced.

In the drawing device 30, the steel cords 11 are adsorbed by the electromagnet embedded in the adsorption plate for transferring the strip 1, but a vacuum type drawing device may be used. In the latter case, a strip containing resin cords therein may be adopted in addition to the strip containing steel cords therein.

What is claimed is:

1. A process for producing a strip joint by feeding a given amount of a strip of a constant width, which is formed by coating a plurality of cords with rubber, onto a conveyor from a position separated by a given distance at the side of the conveyor in a direction of a given inclination angle, cutting the strip along the conveyor, moving the cut strip piece by a given moving pitch amount through the conveyor, joining a front end portion of a subsequently fed strip piece to a rear end portion of the preceding strip piece, and successively repeating these procedures to produce a continuous strip joint, an improvement wherein the number of strip pieces to be joined is decided in accordance with a length of the strip joint to be produced based on the constant width of the strip and the given inclination angle of the strip fed to the conveyor, and the moving pitch amount of the strip piece is calculated from the decided number of the strip pieces and the length of the strip joint to be produced and a width of the strip piece in a moving direction through the conveyor, and the strip pieces are repeatedly moved by controlling the movement of the conveyor based on the calculated moving pitch amount to produce a strip joint having the decided number of the strip pieces such that the amount of a space or a overlapped portion between the rear end portion of the preceding strip piece and the front end portion of the subsequently fed strip piece may be adjusted so the decided number of strip pieces are joined to form the length of the strip joint to be produced.

2. A process according to claim 1, wherein a margin portion is formed in at least one side edge of the strip.

* * * * *